Dec. 9, 1958 B. W. CHAPIN 2,863,602
EXPANSIBLE CHAMBER APPARATUS
Filed June 13, 1955 2 Sheets-Sheet 1
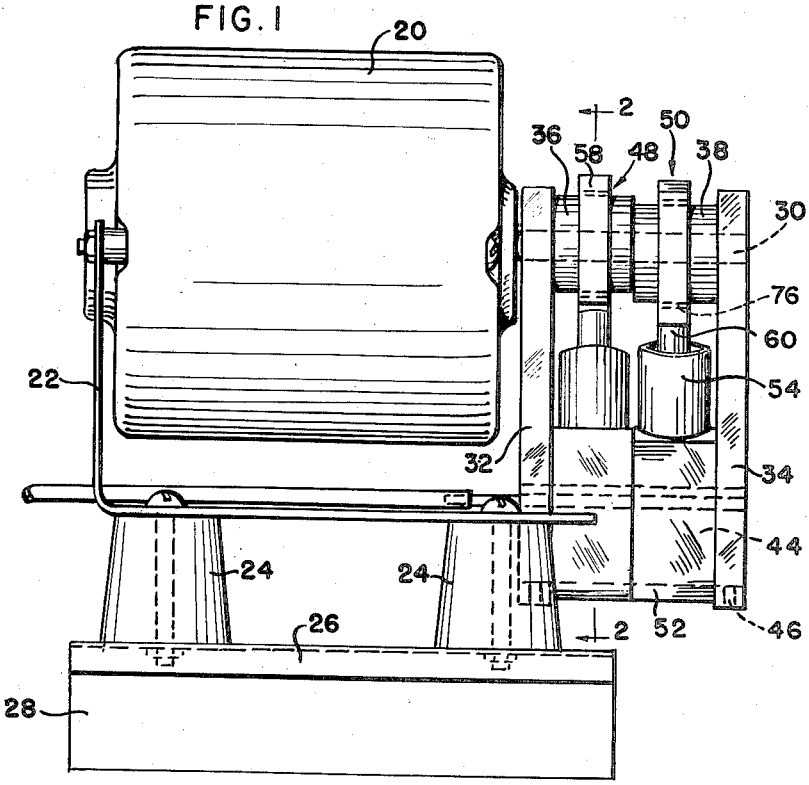
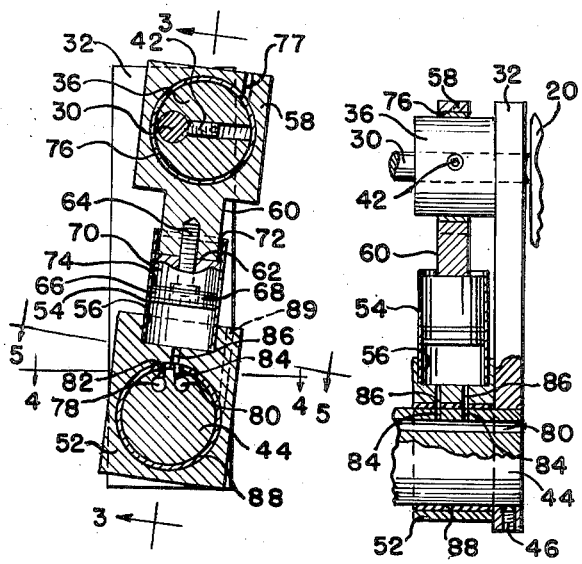
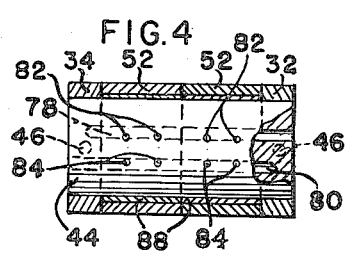
INVENTOR.
BRYAN W. CHAPIN
BY 
ATTORNEY.

Dec. 9, 1958   B. W. CHAPIN   2,863,602
EXPANSIBLE CHAMBER APPARATUS
Filed June 13, 1955   2 Sheets-Sheet 2
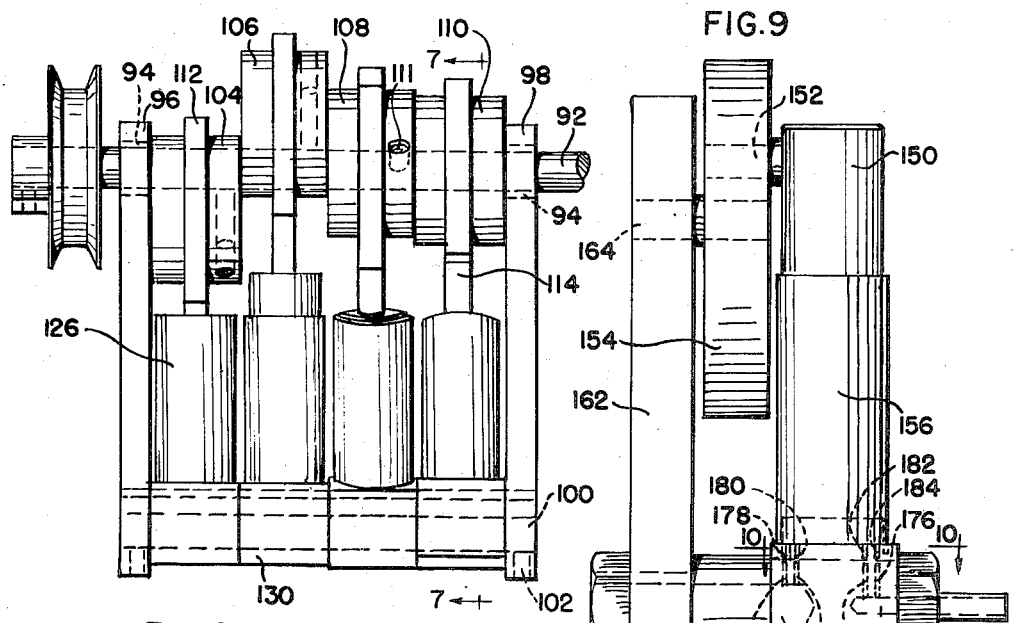
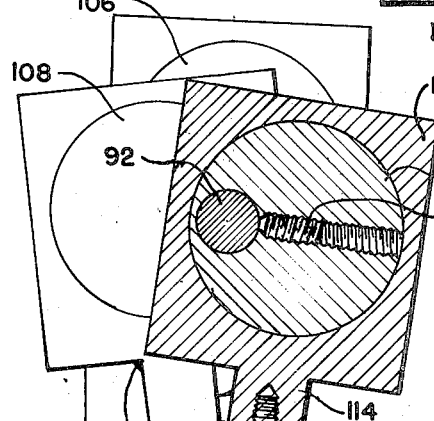
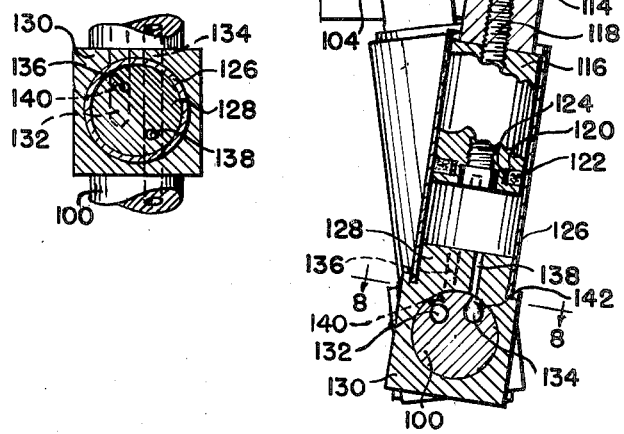
INVENTOR.
BRYAN W. CHAPIN
ATTORNEY.

United States Patent Office
2,863,602
Patented Dec. 9, 1958

2,863,602

EXPANSIBLE CHAMBER APPARATUS

Bryan W. Chapin, Truxton Township,
Cortland County, N. Y.

Application June 13, 1955, Serial No. 515,132

6 Claims. (Cl. 230—175)

This invention relates to piston and cylinder expansible chamber apparatus capable of operating as a compressor, vacuum pump, fluid pressure motor and the like.

The invention is more particularly directed to a novel arrangement of cylinder and piston used singly or in multiple combinations, wherein cylinder and piston assemblies act as an expansible chamber column member between an eccentric or crank shaft and a supporting cylindrical valve bar laterally spaced from and disposed in parallel relation to the axis of the eccentric or crank shaft. The invention when employed as a compressor is particularly adapted to reliably supply a steady volume of compressed air or other gas in a quiet and efficient manner, the apparatus comprising one or more piston and cylinder assemblies comprised essentially of two parts, one of which is journalled on the crank or eccentric shaft, and the other of which is oscillatably supported on a cylindrical ported bar adapted to cooperate with the assembly or assemblies so as to act in cooperation therewith as a valving mechanism, to the end that the cylinder assemblies may act as a compressor, vacuum pump, or a fluid pressure motor, depending on the port connections and the direction of rotation.

It is an object of the invention to provide a mechanism of the type described which comprises essentially four parts, a rotary crank or eccentric shaft, piston and cylinder assemblies composed of a piston and cylinder and a framework hung from the shaft, and having means which in association with one of the assembly parts provides suitable valving for the cylinder and piston assembly.

A further object of the invention is to provide a mechanism of the character referred to in which a crank or eccentric shaft and a valve bar are fixed in parallel axial relation and in which one or more like cylinder and piston assemblies extending between the shaft and valve bar are provided, the assemblies acting to control inlet and exhaust to the cylinder assemblies by the angular oscillation of the assemblies on the valve bar.

The above and other novel features of the invention will appear more fully from the following description when taken in conjunction with the accompanying drawings. It will be understood, however, that the illustrations and drawings are not to be taken as limits of the invention, reference being had to the appended claims for this purpose.

In the drawings wherein like reference characters indicate like parts:

Figure 1 is a side elevation of a two cylinder motor driven pump combination;

Figure 2 is a transverse sectional view taken through one of the cylinder assemblies substantially on the line 2—2 of Figure 1;

Figure 3 is an axial sectional view taken through the cylinder assembly substantially on the line 3—3 of Figure 2;

Figure 4 is a sectional view taken substantially on the line 4—4 of Figure 2;

Figure 5 is a sectional view taken substantially on the line 5—5 of Figure 2;

Figure 6 is a side elevation of a multi-cylinder pump of four cylinders;

Figure 7 is a sectional view taken substantially on the line 7—7 of Figure 6;

Figure 8 is a sectional view taken substantially on the line 8—8 of Figure 7;

Figure 9 is a single cylinder modification; and

Figure 10 is a sectional view taken substantially on the line 10—10 of Figure 9.

Referring to Figure 1, there is shown a small fractional horsepower motor 20, mounted on spaced brackets such as 22, which are in turn supported on resilient pillars 24 mounted upon a flanged base 26. If desired, the base may be provided with a block of sponge or foam rubber 28 or the equivalent for quiet operation. On the motor shaft 30, there are provided spaced depending links or arms 32 and 34, between which are positioned cylindrical eccentrics 36 and 38. Each of the eccentrics is secured to the shaft by set screws such as 42. The lower ends of the arms 32 and 34 are bored to receive a ported cylindrical bar 44, such bar being fixed in the arms by set screws 46. Cylinder and piston assemblies 48 and 50 extend between the eccentrics 36 and 38 and the bar 44. Each assembly comprises a cylinder mounting block 52, which is bored as at 56 to receive a cylinder sleeve 54, press fitted therein. On the eccentrics are positioned connecting rod like elements 58, which have a shank extension 60 adapted to be rigidly connected to a piston 62 by an elongated headed screw 64 extending axially through the piston and threaded in the shank 60. The piston is provided with a ring groove 66, in which is positioned a packing ring 68. The piston, above the ring groove 66, is turned down in diameter and provided with a sleeve 70 which extends over a portion of the shank 60, which is also turned down to receive the sleeve, the shank and cylinder presenting shoulders 72 and 74 to locate the sleeve.

The upper end of each of the connecting rods is preferably provided with an internal sleeve 76 of porous bronze or other bearing material, such sleeve being pressed within the connecting rod bore, and running on the corresponding eccentric. An oil hole 77 leads to the sleeve 76.

The cylindrical bar 44 is provided with lengthwise extending ports 78 and 80 arranged side by side, one of said ports 78 extending from one end, and short of the other end, while the other extends from the other end and terminates short of the one end. Both ports underlie the cylinder head end of the blocks 52. Depending on the direction of rotation of the motor shaft, one of said ports may be an inlet port and the other an outlet port. If rotation be clockwise as in Figure 2, port 80 is the outlet port.

Each of said ports are provided with a pair of small radially extending ports extending toward the shaft 30, the pair of ports 82 leading from the port 78 emerging through the surface of the bar 44, adjacent to but circumferentially spaced from the ports 84 leading from the port 80, the spacing being an arc at least as great, as the angle of oscillation of the blocks upon the bar due to the eccentricity of the eccentrics 36 and 38. Where the ports are of small diameter, such arcuate spacing may approach the angle of oscillation, and where larger, the spacing will be increased by about the diameter of the ports 82 and 84. In the end of each of the blocks 52, are provided a pair of ports 86 of a diameter corresponding to ports 82 and 84, such ports being lengthwise spaced to correspond with the spacing between the pairs of ports 82 and 84. The ports 86 are so disposed as to connect with the ports 82 when the block 52 is rocked to one side, as during the middle portion of the piston up-stroke, and connect with the ports 84 when rocked to the other side, likewise during the middle portion of the piston down-stroke. When the ports 86 couple with the ports 82, the ports 84 are blocked off, and likewise when the ports 84 couple with the ports 86 the ports 82 are blocked off.

It will thus be seen that as the piston travels upward, the block 52 is rocked in one direction to connect the cylinder with the port 78, and air may thus be drawn into the cylinder during the up-stroke. Upon the down-stroke, the block connects with the port 80, and the air drawn into the cylinder is thus caused to discharge through the port 80. The port 78 may be connected to any device requiring sub-atmospheric pressure, or the port 80 may be connected to supply compressed air, or the compressor may be used to provide both vacuum and compressed air simultaneously. A two cylinder arrangement of the type described may thus act as a vacuum pump or compressor or both. Since it would not be self starting, it would not be suitable as a fluid pressure motor.

The compression taking place within the cylinder tends to hold the block 52 against the ported side of the bar 44, so that leakage or loss of air is practically eliminated. Each of the blocks 52 may be provided with a sleeve liner such as 88 of brass or porous bronze or other suitable bearing material so as to eliminate wear. An oil port 89 is provided leading to the sleeve. While the adjacent blocks 52, and arms 32 and 34 may make a close fit against one another, such close fit is not essential due to the seal thus resulting, particularly as when the pump is acting as a compressor. The weight of the assembly depending from the motor shaft is sufficient to react against the torque of the shaft delivered to the assembly, although it will appear that the frame brackets extend forwardly a sufficient distance to constrain the unit from rotation with the shaft.

The compressor may be adapted to a multiple group of cylinders, four in number being shown in the modification of Figure 6. As there shown, the shaft 92 is journalled in bearing sleeves 94 disposed in one end of the arms 96 and 98. The other end of the arms has fixed therein the ends of a cylindrical ported bar 100, secured as by set screws 102. The shaft 92 has mounted thereon a plurality of eccentrics 104, 106, 108 and 110, the eccentrics being angularly disposed with respect to one another by 90° and held on the shaft by set screws 111, the eccentrics 104 and 106 being disposed at 180° to each other and 90° from the eccentrics 108 and 110. The angular displacement between eccentrics will vary with the number of cylinder and piston assemblies. For example, with 3 eccentrics, or 6, the angular spacing would be 120° or 60° respectively.

Each cylinder and piston assembly comprises a connecting rod 112 having a shank 114 to which is secured a piston 116, by an axially extending headed screw 118. The piston is provided with a ring groove 120, in which is positioned a packing 122, which may be backed by a coiled leaf spring 124 lying in the bottom of the groove, such leaf spring comprising in excess of one turn to provide over lapped ends, and uniform outward radial pressure on the packing over the entire circumference thereof. The cylinder is formed of a sleeve 126 having a press fit at one end over a cylindrical projection 128 of the cylinder head block 130. The cylinder head block is in turn fitted on the bar 100 and adapted to rock thereon.

The bar is provided with lengthwise extending ports 132 and 134, each open at one end, and closed by terminating short of the other end. Radial ports 136 and 138 disposed in staggered relation are provided for each head block, and corresponding ports 140 and 142 are provided in each head block, in staggered relation so as to couple with the ports 136 and 138, the relation being such that port 136 is adapted to couple with port 140, when the block is rocked to one side as when the piston is, for example, in mid up-stroke, and the port 138 and the port 142 are adapted to be coupled when the piston is in mid down-stroke and the block rocked to the other side. The angular spacing between the ports 136 and 138 is such as to cause one or the other to match up with the ports 140 and 142 as the block rocks from one side to the other. Because of the limited angle through which the block rocks, and the desirability of employing reasonably sized ports, the actual alignment of the ports may be dispensed with, it being sufficient if the ports 136 and 140, and 138 and 142 overlap by not more than about ½ of their diameters so as to provide a somewhat eliptical overlap. If desired, a plurality of smaller ports can be used, as has been disclosed in conjunction with Figures 1–5 inclusive. The ports may be so arranged as to commence to connect on one side, and cut off on the other as the eccentrics pass dead top and bottom center.

It will be understood that the corresponding ports 136 for each of the cylinders will couple with the corresponding ports 140 of the cylinder block as the cylinder blocks of the various cylinder assemblies are rocked to the extreme position on one side, and the same is true of the ports 138 and 142 when the cylinder assemblies rock to the other side.

The arrangement thus described may act as a compressed air motor, a compressor, or a vacuum pump, as will be readily appreciated. For example, if compressed air were connected to the port 134, the piston would be driven upward over top dead center, and on its return stroke the cylinder would exhaust through port 132, port 134 being the compressed air supply port for all cylinders, and port 132 being the exhaust for all cylinders, resulting in rotation counter clockwise as shown in Figure 8. For reverse rotation, the port connections would merely require reversing so as to provide port 132 with compressed air. When operating as a vacuum pump, or compressor, the proper connections will be made to the ports 132 and 134 depending on the direction of rotation, and merely by reversing the rotation, the duct which delivered air under pressure may become a source of vacuum.

In Figure 9 there is shown a single cylinder modification, comprising a solid piston 150, having an integral lateral extending crank pin 152 journalled in an eccentric aperture in a flywheel 154. The piston reciprocates within a cylinder sleeve 156 secured to a cylinder head block 158 which is rockably supported on the cylindrical ported member 160. The ported member is fixed to an arm 162 one end of which is provided with a stub shaft 164 for the flywheel 154. The member 160 is provided with axial ports 166 and 168 extending from opposite ends and terminating short of the axial center of the cylinder. Ports 170 and 172 extend radially from the port 166, and ports 174 and 176 extend radially from the port 168. The ports 170 and 172 lie in an axial plane disposed at an angle to the plane in which the ports 174 and 176 lie. The head block 158 is provided with two sets of ports 178 and 180, and 182 and 184 all lying in the same plane. The ports 178 and 180 are adapted to connect with ports 170 and 172 when the block is rocked to one side by the crank pin, and the ports 182 and 184 are adapted to connect with ports 174 and 176 when the block is rocked to the other side by the crank pin.

The member 160 is provided with a shoulder 186, and a nut 188 between which the block 158 is confined axially, and the port 168 may be smaller than the port 166 and be provided with a convenient nipple to which a compressed air hose or the like may be attached.

From the foregoing, it will be appreciated that a unit of the type shown in Figure 1 is ideally adapted for the supplying of a steady stream of air to acquariums and the like for aeration, or for use in conjunction with inhalators. The simplicity of the apparatus lends itself to such purposes as require continuity of operation, without danger of breakdown or failure. The many uses will readily appear to those acquainted with the various requirements in the different arts.

While several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a device of the character described, in combination, a shaft, an eccentric crank thereon, a frame journalled on said shaft and freely suspended therefrom, said frame having a bar extending parallel with said shaft and spaced laterally from the crank thereof, said bar having a cylindrical surface facing said shaft, a cylinder and piston assembly having a member oscillatably mounted on said bar and a member journalled on said eccentric crank, inlet and outlet ports in said bar having radial branches extending to the cylindrical surface thereof, said ports extending toward said eccentric crank only whereby to provide a sealing effect from pressure within the cylinder, and port means in said oscillatory mounted member adapted to alternately connect with said branches upon oscillatory movement of said oscillatable member between the limits of oscillation, said shaft forming the sole support for said frame and cylinder and piston assembly.

2. In a device of the character described, in combination, a shaft, eccentric cranks thereon, a frame journalled on said shaft and freely suspended therefrom, a cylindrical bar supported by said frame member and extending parallel with said shaft and spaced laterally from the cranks thereof, cylinder and piston assemblies each having a member oscillatory mounted on said bar and a member journalled on one of said eccentric cranks, inlet and outlet ports in said bar having radial branches extending to the surface thereof toward said cranks only, and port means in said oscillatably mounted member adapted to alternately connect the cylinder with said branches upon oscillatory movement of said oscillatable member between the limits of oscillation, said shaft forming the sole support for said frame and cylinder and piston assemblies.

3. In a device of the character described, in combination, a shaft, eccentric cranks thereon, a frame member journalled on said shaft and freely suspended therefrom, a bar supported by said frame member and extending parallel with said shaft and spaced laterally from the cranks thereof, said bar having a cylindrical surface facing said shaft, cylinder and piston assemblies comprising two members telescopically disposed with respect to each other, one of said members of each assembly being oscillatably mounted on said bar and the other journalled on one of said eccentric cranks, inlet and outlet ports in said bar having radial branches extending to the cylindrical surface thereof and toward said cranks only, and port means in said oscillatably mounted member adapted to alternately connect the cylinder with said branches upon oscillatory movement of said oscillatable member between the limits of oscillation, said shaft forming the sole support for said frame member and cylinder and piston assemblies.

4. In a device of the character described, in combination, a shaft, an eccentric crank thereon, a frame member having a journal on said shaft and depending therefrom so as to hang from said shaft, a bar supported by said frame member and extending parallel with said shaft and spaced laterally from the crank thereof, said bar having a cylindrical surface facing said shaft, a cylinder and piston assembly having a member oscillatably mounted on said bar and a member journalled on said eccentric crank, inlet and outlet ports in said bar having radial branches extending to the cylindrical surface thereof, said radial branches each comprising a plurality of ports lying in a common plane parallel with the axis of said cylindrical surface and axially spaced and extending toward said crank only, port means in said oscillatably mounted member comprising a plurality of bores axially spaced with reference to said axis and to correspond to the spacing of said branch ports and adapted to alternately connect with said branch ports upon oscillatory movement of said oscillatable member between the limits of oscillation and means to axially position said oscillatable member on said bar, said frame member, cylinder and piston assembly and bar being supported solely from said shaft, and means to prevent said frame member from rotating about the axis of the shaft.

5. In a device of the character described, in combination, a shaft, eccentric cranks thereon uniformly spaced angularly, a frame member having a journal on said shaft, said frame member being suspended from said shaft, a cylindrical bar supported by said frame member and extending parallel with said shaft and spaced laterally from the cranks thereof, cylinder and piston assemblies each having a cylinder head block member oscillatably mounted on said bar and a cylinder sleeve extending therefrom and a piston member having a connecting rod portion rigid therewith journalled on one of said eccentric cranks, inlet and outlet ports in said bar having radial branches extending to the surface thereof in the general direction of said cranks only for each of said cylinder assemblies, and port means in each of said oscillatably mounted block members adapted to alternately connect the cylinder with said branches upon oscillatory movement of said oscillatable block members between the limits of oscillation, said frame member, bar and assemblies being supported solely from said shaft.

6. In a device of the character described, in combination, a shaft, adjacent eccentrics thereon uniformly spaced angularly, a frame comprising members each having a journal for said shaft disposed on opposite sides of said eccentrics, a cylindrical bar supported by said frame members and extending parallel with said shaft and spaced laterally from the eccentrics thereof, cylinder and piston assemblies each having a head block member and cylinder sleeve oscillatably mounted on said bar and a piston and connecting rod rigid therewith journalled on one of said eccentrics, inlet and outlet ports extending paraxially into said bar each having radial branches extending to the surface thereof in a direction toward said shaft only for each cylinder assembly, and port means in each of said oscillatably mounted block members adapted to alternately connect with said branches upon oscillatory movement of said oscillatable member between the limits of oscillation, said frame, bar and assemblies being hung from and solely supported by said shaft.

References Cited in the file of this patent

UNITED STATES PATENTS

| 316,631 | Lenhardt | Apr. 28, 1885 |
| 891,026 | Zeitlin | June 16, 1908 |
| 1,010,902 | Hansen | Dec. 5, 1911 |

FOREIGN PATENTS

| 1,169 | Great Britain | of 1869 |
| 8,854 | Great Britain | of 1911 |